Jan. 27, 1959     D. R. TURNIPSEED     2,870,820
AUXILIARY TRACTOR SEAT
Filed Jan. 4, 1957
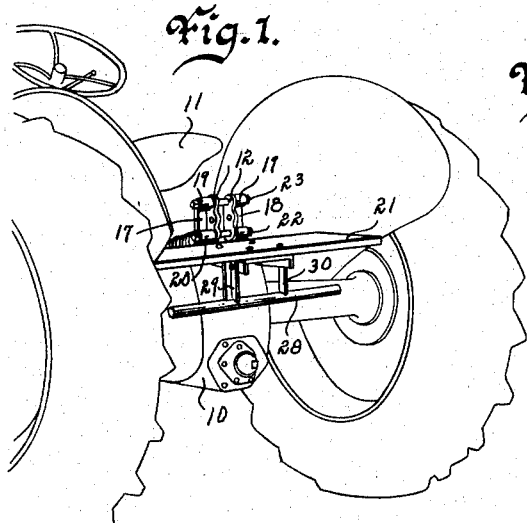
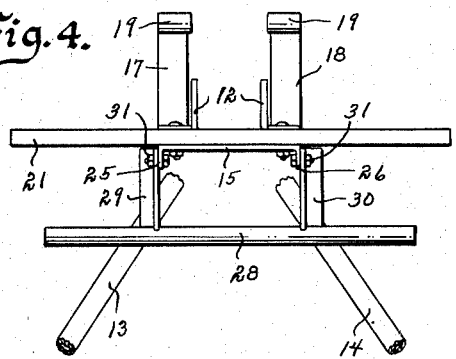
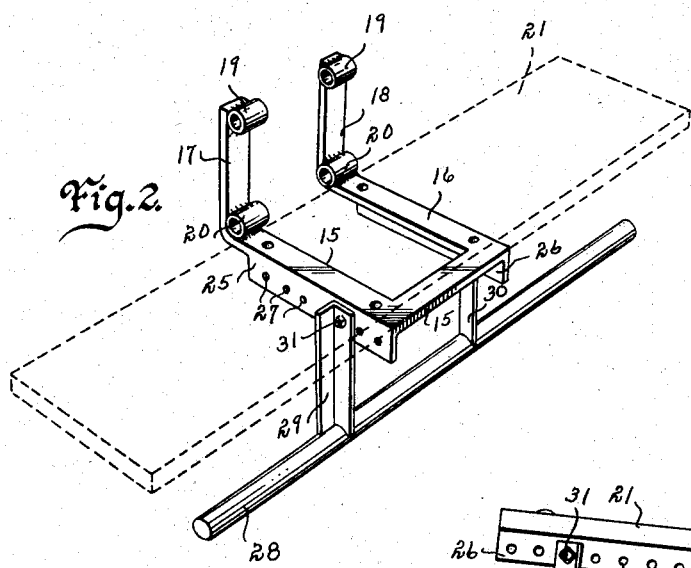
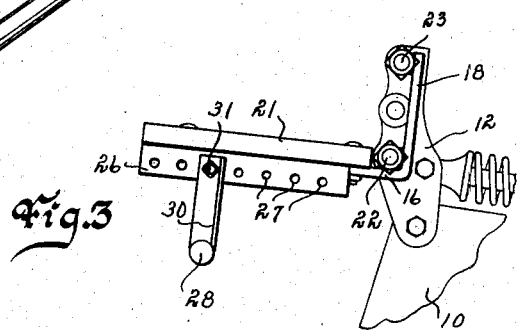
Inventor
David R. Turnipseed
by M. Talbert Dick
Attorney
Witness
Edward P. Seeley

# United States Patent Office 2,870,820
Patented Jan. 27, 1959

2,870,820

AUXILIARY TRACTOR SEAT

David R. Turnipseed, Sigourney, Iowa

Application January 4, 1957, Serial No. 632,475

4 Claims. (Cl. 155—78)

This invention relates to an implement seat and more particularly to an auxiliary seat platform for tractors.

Tractors are provided with a one person seat for the driver of the tractor. However, there are many occasions when additional individuals wish to ride the tractor along with the operator. Some desire to ride on the tractor for pleasure, but many must be accommodated by necessity, such as riding the tractor to the work field, or from the work field. Also, there is the problem of transporting help from one field to another field. Furthermore, certain implements being drawn by the tractor require a helper besides the tractor operator to control or operate the implement. In most cases the riders, besides the tractor operator, sit on the tractor wheel fenders, but this procedure is very dangerous and uncomfortable.

Therefore, the principal object of my invention is to provide an auxiliary seat bench for tractors.

A further object of this invention is to provide a readily attachable and detachable auxiliary seat means for tractors.

Still further objects of my invention are to provide an auxiliary seat for tractors that is economical in manufacture and durable in use.

These and other objects will be apparent to those skilled in the art.

My invention consists in the construction, arrangements and combination, of the various parts of the device, whereby the objects contemplated are attained as hereinafter more fully set forth, specifically pointed out in my claims, and illustrated in the accompanying drawings, in which:

Fig. 1 is a perspective view of my seat mounted on a tractor,

Fig. 2 is an enlarged perspective view of the bracket portion of my tractor seat, Fig. 3 is an enlarged side view of my device installed on a tractor, and Fig. 4 is an enlarged rear end view of my seat and more fully illustrates its construction.

In the drawings I have used the numeral 10 to generally designate an ordinary farm tractor. The operator's seat is designated by the numeral 11. Most all tractors have a lift rocker 12 at the rear of the seat 11. Such lift rockers have at least one horizontal hole means for receiving a bolt pin for attachment of the tractor drawn implement (not shown). Some tractors have a plurality of vertically arranged horizontal hole means for selective positioning of the bolt pin to accommodate different type implements and different pull force characteristics. The Ford tractor has such a plurality of hole means and as shown in Fig. 1. My seat is adapted to fit either tractor type. Also, most such tractors, even if they do not have a series of hole means in the lift rocker, do have link leveling crank arms 13 and 14. These two arms extend downwardly and outwardly, as shown in Fig. 4. I have generally designated my seat supporting bracket by the numeral 15. This bracket 15 has a horizontal portion 16 and two upwardly extending spaced apart arms 17 and 18, as shown in Fig. 2. At the upper end of each arm is a horizontal bearing 19. Near the lower end of each arm is a horizontal bearing 20. The two bearings 19 are in line with each other as are the two bearings 20. This distance between the two arms is greater than the width of the lift rocker 12. The numeral 21 designates a seat board bolted, riveted, or like, to the horizontal portion 16 of the bracket. To use the seat as shown in Fig. 1, the bolt pin means of the lift rocker is removed, the device is then placed in position with the two arms 17 and 18 at each side of the lift rocker 12, and a longer bolt pin means 22 inserted through the lower holes of the lift rocker and the two bearings 20 of the bracket arms. A second bolt pin means 23 is inserted through the upper holes of the lift rocker and the two bearings 19 of the bracket arms. Thus, the seat bracket will be rigidly detachably secured to the tractor and the seat board 21 will extend between the two fenders of the tractor and back of the tractor operator's seat.

However, as before indicated, some tractors do not have a plurality of selective holes through the lift rocker. Therefore, to accommodate such tractors only one bolt pin means can be used to extend through the bearings of the bracket arm and the lift rocker, and other supporting means must be employed. On the bottom of the horizontal base portion, I form two spaced apart elongated flanges 25 and 26. These flanges extend longitudinally with the longitudinal length of the tractor and each has a row of bolt hole openings 27. The numeral 28 designates an elongated shaft rod. Extending upwardly from the shaft rod are two spaced apart angle irons 29 and 30 adapted to extend to the inner or outer sides respectively of the two flanges 25 and 26. A bolt 31 extends through the upper end of each of the angle irons and selectively through a hole 27 of the adjacent bracket flange. When my device is installed, the shaft rod 28 will ride on the two leveling arms 13 and 14, as shown in Fig. 4, and thus prevent the lateral rocking of the seat on the bolt means extending through the lift rocker. However, the seat may not be supported in a horizontal plane due to the position of the leveling arms, and therefore adjustment may be necessary. This is accomplished by selecting the proper holes 27 and thereby moving the rod shaft forwardly or rearwardly on the leveling arms.

From the foregoing it will be appreciated that I have provided a readily detachable or attachable auxiliary seat for tractors and one that will successfully fit substantially all farm tractors.

Some changes may be made in the construction and arrangement of my tractor seat without departing from the real spirit and purpose of my invention, and it is my intention to cover by my claims, any modified forms of structure or use of mechanical equivalents which may be reasonably included within their scope.

I claim:

1. In an auxiliary tractor seat, a horizontal base portion having a seat thereon, two spaced apart vertical arms on the forward end of said base and adapted to extend at each side of the lift rocker of a tractor, two spaced apart horizontal bearings on each of said vertical arms; said two bearings of one arm being in line with the two bearings, respectively, of the other said arm, at least one bolt means extending through at least one bearing of each of said arms; said bolt means also adapted to extend through the lift rocker of a tractor, an elongated horizontal rod shaft adapted to engage the leveling arms of a tractor, and a post means extending upwardly from said rod shaft and horizontally adjustably secured to said horizontal base.

2. In combination with a tractor having a lift rocker, a horizontal base portion having a seat thereon, two spaced apart vertical arms on the forward end of said base and adapted to extend at each side of the lift rocker of said tractor, two spaced apart horizontal bearings on each of said vertical arms; said two bearings of one arm being in line with the two bearings, respectively, of the other said arm, and a single bolt extending through each two bearings that are in line with each other and extending through the lift rocker of said tractor.

3. In combination with a tractor having a lift rocker and leveling arms, a horizontal base portion having a seat thereon, two spaced apart vertical arms on the forward end of said base and adapted to extend at each side of the lift rocker of said tractor, two spaced apart horizontal bearings on each of said vertical arms; said two bearings of one arm being in line with the two bearings, respectively, of the other said arm, at least one bolt means extending through at least one bearing of each of said arms and extending through the lift rocker of said tractor, and a downwardly extending support on said horizontal base portion adapted to engage the leveling arms of said tractor.

4. In an auxiliary tractor seat, a horizontal base portion having a seat thereon, two spaced apart vertical arms on the forward end of said base and adapted to extend at each side of the lift rocker of a tractor, two spaced apart horizontal bearings on each of said vertical arms; said two bearings of one arm being in line with the two bearings, respectively, of the other said arm, at least one bolt means extending through at least one bearing of each of said arms; said bolt means also adapted to extend through the lift rocker of a tractor, an elongated horizontal rod shaft adapted to engage the leveling arms of a tractor, two spaced apart downwardly extending flanges on said horizontal base, each having a horizontal row of bolt holes, two upwardly extending spaced apart arms on said rod shaft extending to the sides of said flanges, respectively, and a bolt means extending through each of said last mentioned arms and selectively through one of the holes of the adjacent flange thereto for horizontally adjustably securing said rod shaft relative to said seat.

References Cited in the file of this patent
UNITED STATES PATENTS

| | | |
|---|---|---|
| 1,487,243 | Jackson | Mar. 18, 1924 |
| 2,378,678 | Anderson | June 19, 1945 |
| 2,399,792 | Copp | May 7, 1946 |